Sept. 17, 1957  O. KLOKSETH  2,806,426
BLASTING MATS
Filed March 7, 1955
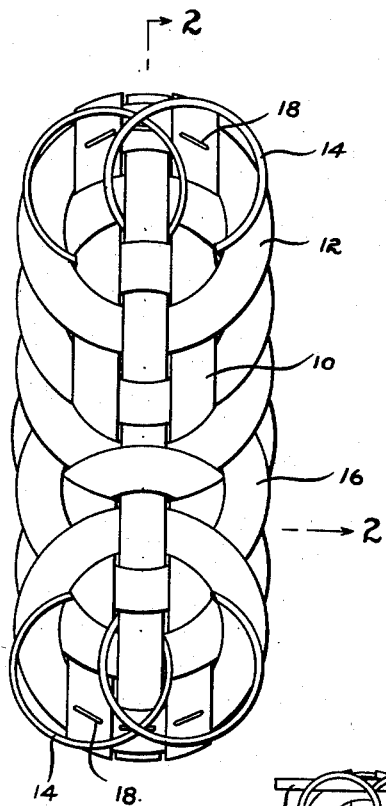
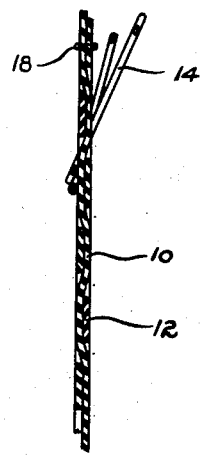
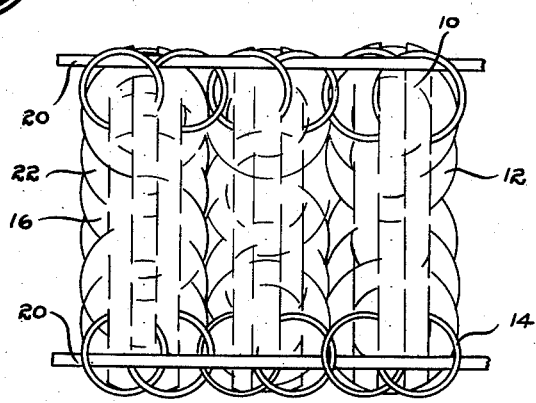
INVENTOR
OLE KLOKSETH
ATTORNEY

United States Patent Office 2,806,426
Patented Sept. 17, 1957

2,806,426
BLASTING MATS
Ole Klokseth, Lulu Island, British Columbia, Canada
Application March 7, 1955, Serial No. 492,580
1 Claim. (Cl. 102—22)

My invention relates to improvements in blasting mats.
This invention relates to mats such as are used during a blasting operation to lessen the danger from flying fragments.

The objects of the invention are to provide a mat which will not become wet or matted with clay or other earthy material whereby the mat becomes extremely heavy and may have to be placed in position by a crane, and to provide a mat which is capable of being made up in convenient, light and easily handled units to any desired width to cover blast areas greater than normal.

Referring to the accompanying drawings:
Figure 1 is an elevational view of a unit of the mat.
Figure 2 is a sectional view taken on the line 2—2 of Figure 1.
Figure 3 is an elevational view, on a reduced scale, showing a composite blasting mat which may be formed of several units.

In the drawings like characters of reference indicate corresponding parts in each figure.

The material used in the manufacture of the mat units is preferably derived from worn tire casings which are cut up to provide longitudinal strips 10 from the tread, annular bands 12 from the side walls and handling rings 14 from the beads of the tires.

In the preferred form as here shown, the strips 10 are slightly less than one third of the diameter of the opening in the bands 12, as this cuts up to greater advantage in the manufacture of mat units from passenger car and light truck tires which are available in greater volume than in other types and sizes. I prefer, on account of ease of handling, to make up the mat units 16 using seven bands 12 interwoven with three strips 10, though they can be made up to any desired length and with any desired number of bands. The several parts are assembled as follows. To make a compact mat without openings therethrough of a substantial size, one set of three bands are laid down in overlapping relation so that the opening in the first is closed by portions of the second and third bands, another set of three bands are assembled in a similar but opposite manner, the free ends of the sets of bands are arranged facing each other, with the third band of each set joining one with the other in overlying relation, a seventh band is centered between the two sets and is interwoven between the free ends of the bands of both sets, thus leaving all the openings of all the bands covered with transversely disposed material. A longitudinal strip 10 is next interwoven along the centre of the assembled sets of bands and its ends laid down upon and stapled as at 18 to the outer edge of the first laid bands of each set, a strip 10 is next interwoven through the transverse portions of the bands on both sides of the first interwoven band and is stapled as above described at its outer end to the ends of the mat unit. One or more rings 14 are woven between the bands and the strips adjacent each unit, which rings serve as handles for lifting and placing a unit in a desired position. If desired, the rings may be threaded by a bar or piece of dimension lumber 20 to make up a mat of several mat units as shown at 22 in Figure 3.

It will be obvious that each mat unit may be of sets of any number of bands, so long as at least three are used at the ends of the unit and their free ends are interfolded.

While the longitudinal strips are arranged in sets of three side by side, it is possible to use one only or any odd number so that they can be properly interlaced with the transverse portions of the bands.

Mats made up of a plurality of mat units 16 may be hung on an inclined or vertical surface when blasting out a face of rock or otherwise. Since the force exerted in blasting is always substantially normal to the plane in which the mat is resting, said mat cannot be separated into original units or open up to the point where rock or other unbroken material may fly freely from the shot hole.

What I claim as my invention is:
A blasting mat unit formed of a row of annular flexible bands formed of two end parts each consisting of at least three of said bands and being laid upon each other in overlapping relation whereby each successive band is laid with a transverse part cutting across the opening of the band next below, said bands being laid up in opposite directions in each end part with a portion of the topmost band of each end part in superposed position, a further band centrally disposed below said end parts, one longitudinal flexible member interwoven across the centre of all the bands and secured to the outermost band of each row, and at least a pair of similar longitudinal flexible members interwoven across all the bands, the width of the longitudinal members when assembled being substantially equal to the inner diameter of the annular bands and all of the second named longitudinal flexible members being intimately secured to the outer edge of the end bands of the unit, and a pair of rings interlaced between some of the longitudinal members and the outermost but one annular band at each free end of the unit for serving in the securing of one unit to another.

References Cited in the file of this patent
FOREIGN PATENTS

| | | |
|---|---|---|
| 124,596 | Sweden | Apr. 12, 1949 |
| 127,369 | Sweden | Feb. 14, 1950 |
| 130,011 | Sweden | Nov. 7, 1950 |
| 134,536 | Sweden | Feb. 19, 1952 |
| 144,861 | Sweden | Apr. 13, 1954 |